A. BENZ, Jr.
METHOD OF TREATING DOUGH.
APPLICATION FILED JUNE 16, 1920.
1,369,724.
Patented Feb. 22, 1921.
3 SHEETS—SHEET 1.
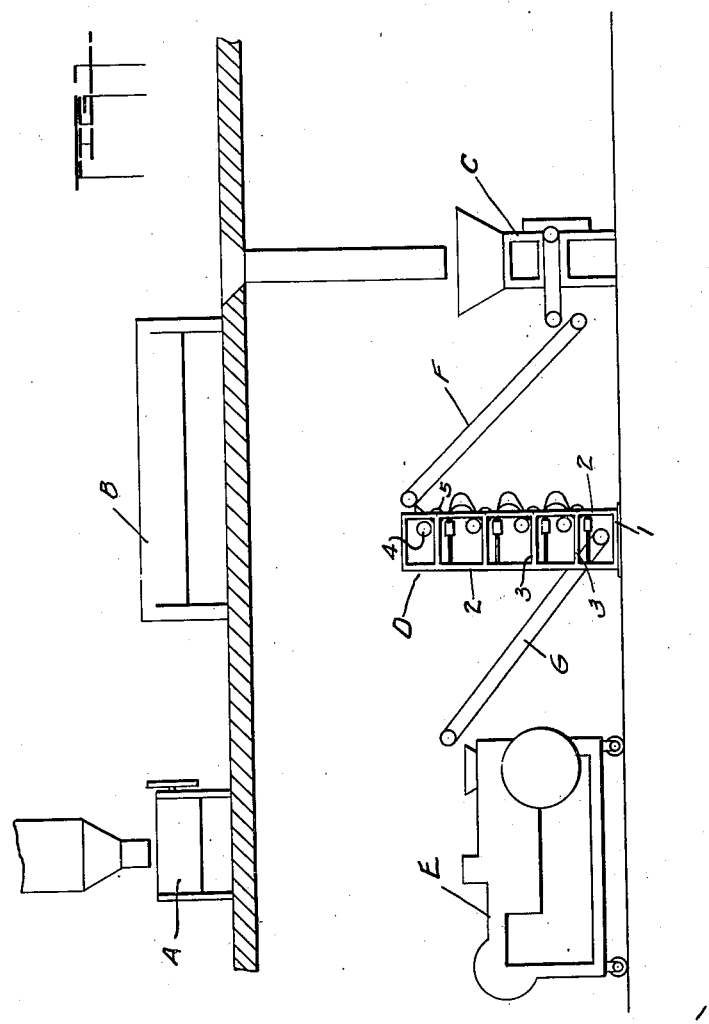
INVENTOR
Adolph Benz Jr
By Chas H Laforte
ATT'Y

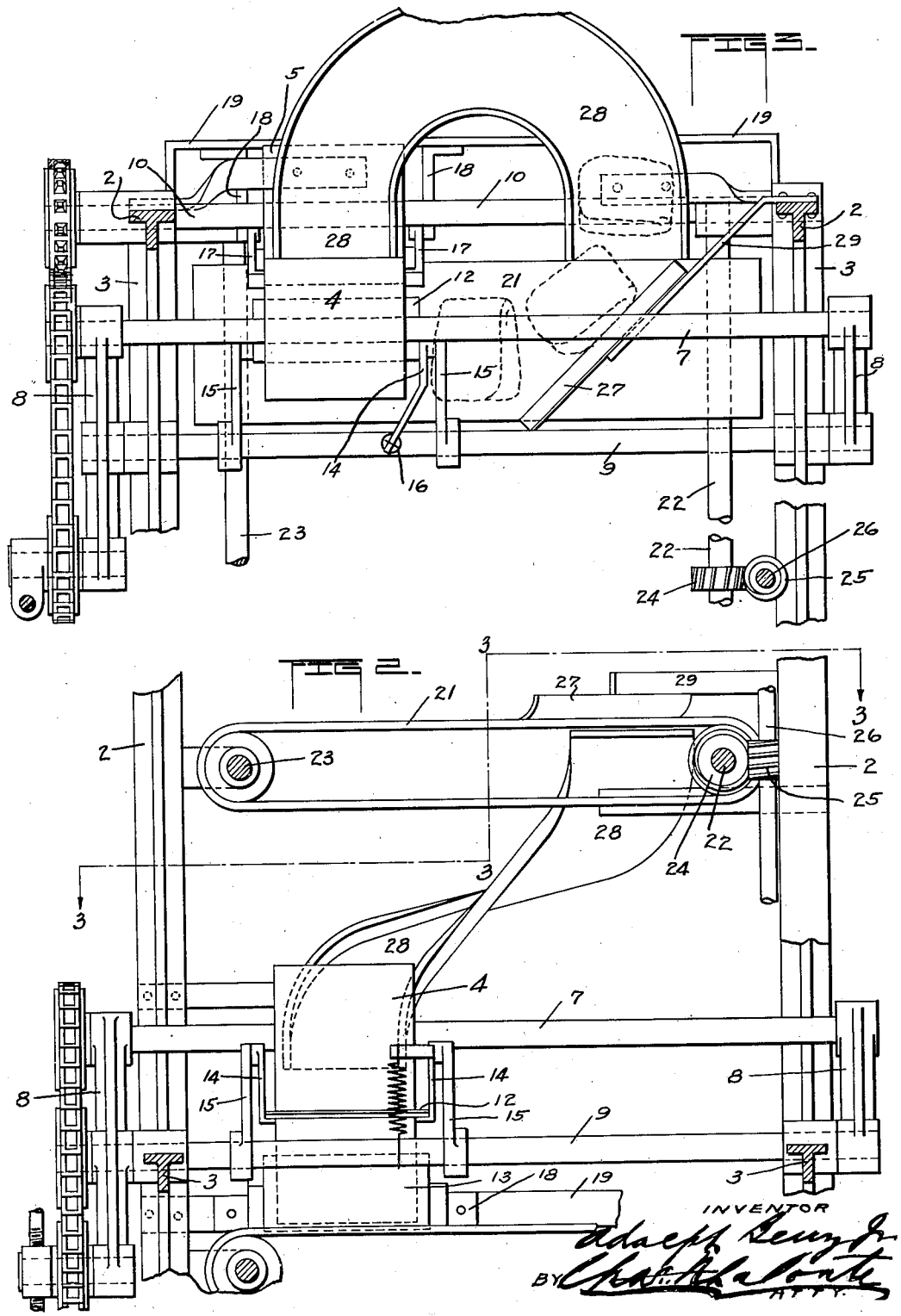

A. BENZ, Jr.
METHOD OF TREATING DOUGH.
APPLICATION FILED JUNE 16, 1920.
1,369,724.
Patented Feb. 22, 1921.
3 SHEETS—SHEET 3.
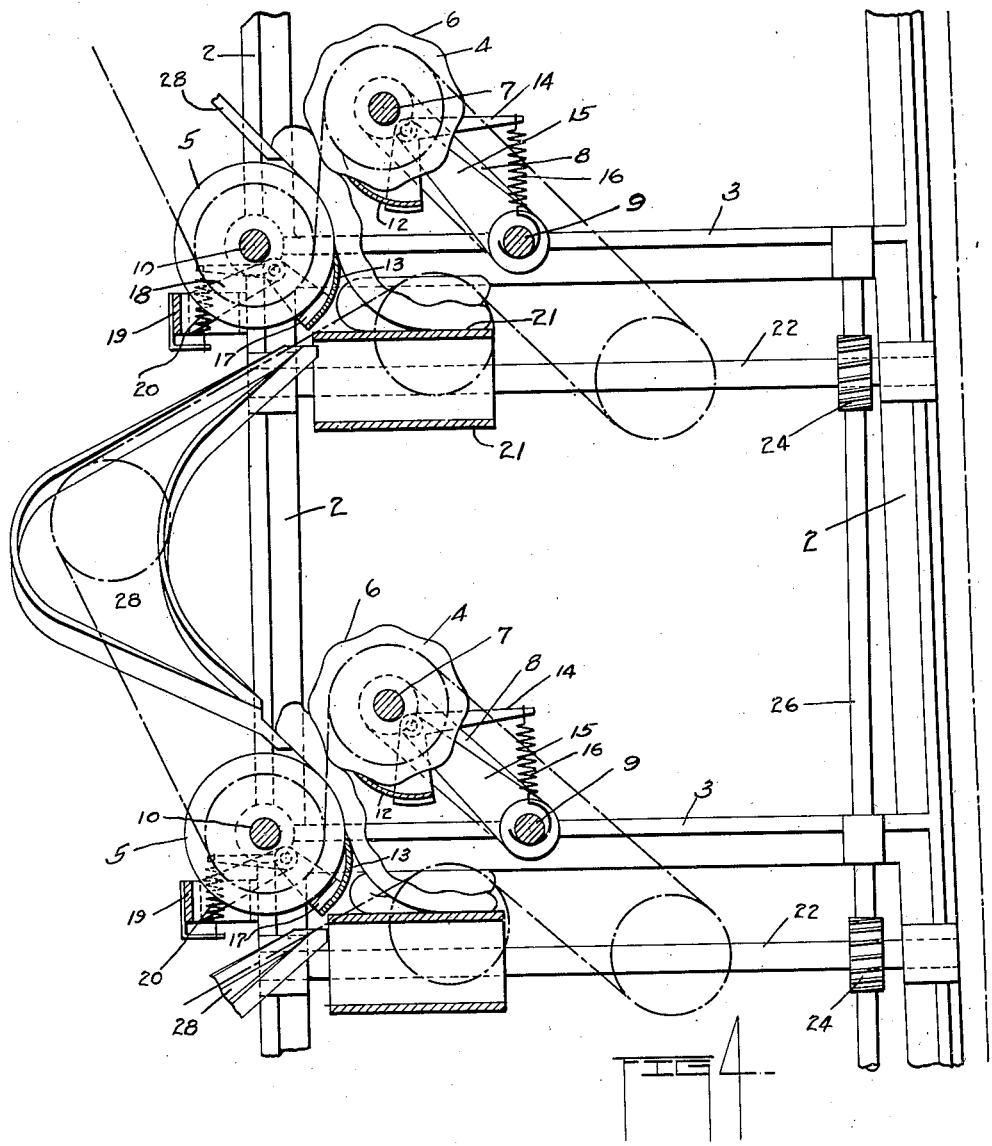
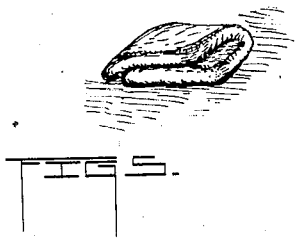

UNITED STATES PATENT OFFICE.

ADOLPH BENZ, JR., OF PEORIA, ILLINOIS.

METHOD OF TREATING DOUGH.

1,369,724.  Specification of Letters Patent.  Patented Feb. 22, 1921.

Application filed June 16, 1920. Serial No. 389,267.

*To all whom it may concern:*

Be it known that I, ADOLPH BENZ, Jr., a citizen of the United States, a resident of Peoria, in the county of Peoria and State of Illinois, have invented new and useful Improvements in Methods of Treating Dough, of which the following is a specification.

This invention has reference to a new and improved method of treating dough used for the making of bread, etc., and especially dough made from wheat flour, the constituent parts of which are wheat starch and gluten.

At the present time the process most commonly used by bakers in the preparation of the dough in bread making, is to first mix the batch, including wheat flour, sugar, salt, yeast, shortening and water, in a suitable "mixing" machine. After mixing the dough it is placed in "fermenting" troughs and punched or worked down, at proper intervals, until the dough has reached the correct degree of fermentation, or age. The length of time required for fermentation depends on the quantity and quality of the gluten contained in the flour.

The fermenting step in the process is for the purpose of conditioning or aging the gluten in the dough. This is accomplished through the action of the acids developed and expansion due to the gases developed. The acids act to soften the gluten, and the gases formed, act to expand or stretch the gluten.

After fermentation the dough is removed from the fermenting troughs and is placed in a "dividing" or "scaling" machine. Here the dough is divided into loaf units of any desirable size. It is the action of the "divider" on the dough which makes necessary a further and efficient conditioner for the dough to return it to the same or better condition of elasticity it was in when it was removed from the "fermenting" troughs.

The "divider" or "scaling" machine, so called, when cutting the dough into loaf units necessarily compresses the dough. Such compression causes the gluten to get "set-back," or in other words returns it to a snarled or ragged, or jammed and non-elastic state. Furthermore, when the dough is compressed the starches become embedded in the gluten and binds it. This prevents proper expansion of the gases in the loaf, and will also produce thick walled cells, preventing the starch grains from bursting and expanding, resulting in a loaf which is small, dark and honey-combed.

In the processes now commonly used by bakers, it is aimed to overcome this snarling and jamming of the gluten by a "balling" and "proofing" step, after the dividing and before the "molding" of the loaf. The object of the baller is to dry the loaf units, roll the same into balls and form a skin or tissue over the outside to retain the fermentation gases. From the baller the loaf units pass to a "proofer" where they are given a period of rest, and during such period of rest, new gases are formed which are intended to expand and separate the starches and gluten with the idea that the dough will return to the elastic state it was in before being placed in the "divider," or nearly so, and thereby overcome the compression of the divider. It is a fact, however, that this step of "proofing" does not accomplish the stretching of the gluten as effectively as is necessary to return the same to the elastic state it was in when it entered the divider, and due to the fact that the proofing step is of comparatively long duration, the fermentation period is increased, which is undesirable, and the dough is aged at the expense of the flavor. After the "proofing" step the dough balls are passed through the "molding" machine and there made into bread loaves.

My method does away with the "baller" and "proofer," thereby decreasing the period of fermentation and unnecessary aging of the dough at the cost of the flavor. This I accomplish by a conditioner which will break or roll, and fold the dough a multiplicity of times, whereby all the innermost particles of gluten are given a gentle rolling, folding and turning thereby stretching the gluten and bringing the dough to the proper degree of maturity, in the least possible time, so as to avoid aging at the cost of the flavor. Such conditioning of the dough will produce a loaf that is larger in volume, whiter in color, better bloom of crust, better pile of the loaf, smoother grain and better flavor.

I am aware that an attempt has been made to overcome the snarling, and jamming of the gluten, due to the action of the "divider," by placing a tension on the dough during the "molding" of the loaves, and relying on further fermentation to separate the starches and gluten. This tension on the dough, however, is primarily to hold the dough so as to insure the initial coiling in the "molder," which is not always effective, and results in a defective loaf. Such method, however, does not conform to the process herein disclosed which is separate and apart from the step of "molding," and is such as to act on the loaf units in a way to wholly overcome the injurious action of the divider, delivering the loaf in substantially that state of elasticity the dough was in when it left the fermentation troughs.

My invention, like the processes above referred to, may be applied by mechanical means and will be here described with reference to the accompanying drawings, forming a part of the description, in which:

Figure 1 is a diagrammatic side elevation of the mechanism employed in the carrying out of my improved method of treating dough;

Fig. 2 is a detailed side elevation of a part of the dough conditioning machine, by means of which the loaf units of dough are rolled, folded and stretched a multiplicity of times, after leaving the "divider" and before the units enter the "molder;"

Fig. 3 is a plan view of the mechanism shown in Fig. 2, as the same would appear on the line 3—3 of Fig. 2;

Fig. 4 is a vertical cross-section, partly in elevation, of the conditioning machine, showing the successive steps in the process of rolling, folding and stretching the loaf units, and the manner and means of transferring said loaf units between each rolling, folding and stretching step, and Fig. 5 is a perspective view of a loaf unit as it appears after being subjected to a rolling, folding and stretching operation.

In carrying out the invention according to the preferred manner of treating the dough, reference being had to Fig. 1, there is shown a suitable "mixer" A. B designates one of a plurality of "fermenting" troughs. C designates either a "divider" or "scaling" machine. D refers generally to my conditioning machine, and E is the loaf "molder."

Referred to generally and briefly described, the dough after mixing is transferred from the "mixer" A to the "fermenting" troughs B, and when properly fermented is transferred to the "dividing" or "scaling" machine C. As the dough is divided or cut into loaf units, these units are transferred to my conditioning machine D, and after a proper rolling and folding of said loaf units to condition the gluten and return the dough to the elastic condition it was in before the compressing action by the "divider" or "scaler," the said loaf units are transferred to the loaf "molder" where the loaf units are molded into loaves of bread.

The "mixer," "fermenting" troughs, "divider" or "scaling" machine, and the "molding" machine are all well known to those skilled in the art, and need not be illustrated nor described more in detail, than here referred to and shown. My method of treating the dough comprehends all the last mentioned steps, and my conditioner takes the place of the "balling" of the loaf units, as well as the step of "proofing" now in general use and which is more or less objectionable and inadequate for the reasons heretofore particularly enumerated.

The mechanical conditioner which I am about to describe for rolling and folding the loaf units after the compressing action by the "divider" or "scaling" machine which as stated, snarls and jams the gluten, is fully shown, described and claimed as a mechanical means for treating dough in a companion application filed of even date herewith, bearing Serial Number 389,268, and just a sufficient disclosure of the working parts and function of this conditioning machine is herein shown, to disclose the successive steps of rolling and folding the loaf units, and thereby stretching the tissues of gluten.

In Fig. 1, the conditioning machine D receives the loaf units from the "divider" or "scaling" machine C by means of a conveyer F and after the successive steps of rolling and folding the loaf units in the conditioning machine, said loaf units are transferred to the loaf "molder" by means of the conveyer G.

In Figs. 2, 3 and 4 and particularly the last mentioned figure, I have shown more in detail the mechanical means employed for successively rolling and folding the dough.

The conditioning machine includes a suitable base 1 from which upstands the corner posts or standards 2, of which there are preferably four, and said corner posts or standards 2 are connected and braced by means of the cross frames 3.

There are provided a series of sets of rollers 4 and 5, the said sets of rollers preferably disposed in vertical alinement, one set above the other, as best seen in Figs. 1 and 4. In this instance I prefer to show the conditioning machine with at least four sets of these rollers, although in practice, I believe that the method is more effective when the loaf units are rolled and folded, at least by means of eight sets of these rollers. However, I do not desire by said statement or by the disclosure made, to place any limitation on the number of sets of rollers in the conditioning machine, as these may vary, depending on the nature of the dough and the amount of gluten in the wheat flour. The rollers 4 are provided preferably with fluted, serrated or roughened surfaces 6, and said rollers are carried by spindles 7 journaled on arms 8 intended to have adjustment on rods 9, whereby the rollers 4 may be adjusted relatively to the rollers 5. These last mentioned rollers are carried on spindles 10 preferably journaled in certain of the supports or standards 2 and the surfaces of said rollers are preferably smooth.

I am not particularly concerned in this present disclosure as to the manner and means of rotating the sets of rollers 4 and 5, except as illustrated in Fig. 4. The rollers 4 should rotate in an anti-clockwise direction and the rollers 5 in a clockwise direction. This may be accomplished by means of a chain shown in dotted lines in Fig. 4 and partially in full lines in Figs. 2 and 3, adapted to receive its power from any suitable source.

Coacting with each roller 4 and 5, are scraping blades 12 and 13 which insure the release of the dough constituting the loaf units, after the rolling and folding operation of each pair of said rollers. The scraper 12 may be carried by a pair of arms 14 connected with other arms 15 secured to the rods 9, springs 16 holding the scraping blades 12 yieldingly in contact with the surface of the rollers 4. Said springs are connected at one end to the arms 14 and at their other ends to the rods 9. The scraping blades 13 may be connected with arms 17 carried by arms 18 secured to frames 19 attached to and projecting from certain of the upstanding supports 2, and springs 20 yieldingly hold the scraping blades 13 in contact with the rollers 5, said springs having one end connected to the arms 17 and their opposite ends to parts of the frames 19.

The loaf units, as they are acted upon by the sets of rollers 4 and 5, are received upon preferably cross-belt conveyers 21 carried by the cross shafts 22 and 23, the former being the driving shafts for the belt conveyers which receive their power through worm wheels 24 secured to the shafts 22 which mesh with worms 25 carried on an upstanding driving shaft 26 operated in any suitable manner from a driving part or parts.

In Fig. 5, one of the loaf units is shown in perspective to illustrate how each unit is folded upon itself as it is received from between the rollers 4 and 5 upon the movable cross-conveyer 21. These folded loaf units are received in succession by each cross-conveyer, conveyed only a short distance and then by means of the scrapers or wipers 27, are caused to be discharged or removed from the cross-conveyer and received by a chute 28, which will transfer the said folded loaf units by gravity in position to be received by, and entered between the next succeeding pair of rollers 4 and 5, which will act upon the loaf units in the same manner as the preceding rollers 4 and 5, will be received upon a belt conveyer, again discharged into a chute to pass through a corresponding rolling and folding action, as that just preceding. This operation continues from the top of the conditioning machine to the bottom, each loaf unit being acted upon by the succeeding sets of rollers 4 and 5 until the loaf units reach the lower end of the conditioning machine, where they are discharged on to the conveyer G to be transmitted to the loaf "molder."

The scrapers or wipers 27 preferably lie obliquely across the path of travel of the belt cross-conveyers 21, see Fig. 3, and are secured to and supported by the brace arms 29 secured to one of the upstanding supports or standards 2. The position and angularity of these scrapers or wipers 27 is such that when the folded loaf units are received by the chute 28, they have been turned one-quarter way around and are so received and passed through the next succeeding set of rollers 4 and 5 and if four sets of rollers 4 and 5 are employed in a conditioning machine, it is apparent that the said loaf units will be caused to make one complete turn, and if eight sets of such rollers are employed as above suggested, the said loaf units during the action of the conditioning machine will have made two complete turns from the top to the bottom of the machine. Employing this method and the successive operations of the sets of rollers 4 and 5 is to roll and fold the loaf units first in one direction and then in another, this operation continuing and resulting in a complete kneading of the dough constituting the said loaf units, stretching the gluten tissues and delivering the said loaf units at the bottom of the conditioning machine in a state of elasticity, which is equal to, if not better, than the elastic condition in which the dough was received by the "divider" or "scaling" machine.

The corrugating, serrating or roughening surfaces of the rollers 4, as will be understood, is to insure the gripping of the dough to carry the load units between the rollers, and to a point above the cross-conveyers to insure a proper folding of the loaf units; and the speed at which the cross-conveyers 21 travel relatively to the rotation of the rollers 4 and 5, is such that the loaf units will fold upon themselves substantially in the manner shown in Fig. 5 of the drawings, where the loaf unit is shown almost folded upon itself. To accomplish the single fold of the unit strips following each rolling operation, the cross-conveyers move at a speed relatively slower than the rotation of the rollers 4 and 5, so that as the strips of dough are received on the conveyers, the latter will only move a very short distance, insuring that the strip discharged by the rollers will fold approximately upon itself.

The passage of the loaf units through the conditioning machine D, occupies a comparatively short space of time, and as a result of the action of the rollers and the cross-conveyers which roll and fold the dough, the gluten tissues are stretched and brought to a proper maturity, and with a lesser degree of fermentation.

What I claim is:

1. The method of conditioning the gluten of the dough in the making of bread, which consists in preparing a dough batch by fermentation; dividing said batch into loaf units; sheeting said loaf units; folding each sheet by a single fold and repeating such sheeting and folding, the resulting action of which is to stretch the gluten tissues; and finally molding said loaf units into desired shape.

2. The method of conditioning the gluten of the dough in the making of bread, which consists in preparing a dough batch by fermentation; dividing said batch into loaf units; rolling the individual loaf units into strips; folding such strips by a single fold and repeating such rolling and folding, the resulting action of which is to stretch the gluten tissues of the dough of said units; and finally molding said loaf units into desired shapes.

3. The method of conditioning the gluten of the dough in the making of bread, which consists in preparing a dough batch by fermentation; dividing said batch into loaf units; rolling the individual loaf units into strips; folding such strips by a single fold and repeating such rolling and folding during which time the units are in constant motion, the resultant action of which is to stretch the gluten tissues of the dough of said units; and finally molding said loaf units into desired shapes.

4. The method of conditioning the gluten of the dough in the making of bread, which consists in preparing a dough batch by fermentation; dividing such batch into loaf units; rolling the individual loaf units into strips; folding such strips by a single fold and repeating such rolling and folding during which time the units are in constant motion, but moving at a relatively reduced speed between the rolling operations than during such rolling operations; and finally molding said loaf units into desired shapes.

5. The method of conditioning the gluten of the dough in the making of bread, which consists in preparing a dough batch by fermentation; dividing such batch into loaf units; progressively rolling said units into strips and transferring such strips between rolling in a direction transverse to the direction of rolling, such transfer of the strips being at a relatively reduced speed to the rolling, resulting in the strips being folded by a single fold during each transfer; and finally molding said units into desired shapes.

In witness whereof I have hereunto affixed my hand this 12th day of June, 1920.

ADOLPH BENZ, Jr.